United States Patent
Wouters et al.

(10) Patent No.: US 11,580,531 B2
(45) Date of Patent: Feb. 14, 2023

(54) SYSTEMS AND METHODS FOR MINIMIZING USER INTERACTIONS FOR CARDHOLDER AUTHENTICATION

(71) Applicant: MasterCard International Incorporated, Purchase, NY (US)

(72) Inventors: Valerie Wouters, Genval (BE); Cristian Radu, Beauvechain (BE); Alan Johnson, Maldon (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 470 days.

(21) Appl. No.: 15/686,532

(22) Filed: Aug. 25, 2017

(65) Prior Publication Data
US 2019/0066096 A1    Feb. 28, 2019

(51) Int. Cl.
G06Q 20/36    (2012.01)
G06Q 20/12    (2012.01)
G06Q 20/20    (2012.01)
G06Q 20/40    (2012.01)
G06Q 20/38    (2012.01)
G06Q 20/34    (2012.01)

(52) U.S. Cl.
CPC ......... *G06Q 20/3674* (2013.01); *G06Q 20/12* (2013.01); *G06Q 20/20* (2013.01); *G06Q 20/34* (2013.01); *G06Q 20/385* (2013.01); *G06Q 20/4018* (2013.01)

(58) Field of Classification Search
CPC .... G06Q 20/3674; G06Q 20/12; G06Q 20/20; G06Q 20/34; G06Q 20/385; G06Q 20/4018
See application file for complete search history.

(56) References Cited

U.S. PATENT DOCUMENTS

| | | | |
|---|---|---|---|
| 9,444,824 B1* | 9/2016 | Balazs | H04L 63/08 |
| 10,122,719 B1* | 11/2018 | Vltavsky | H04W 12/33 |
| 2002/0116333 A1* | 8/2002 | McDonnell | G06Q 20/10 |
| | | | 705/40 |

(Continued)

FOREIGN PATENT DOCUMENTS

WO    WO-2015195176 A1 * 12/2015    ......... G06Q 20/3674

OTHER PUBLICATIONS

Alak Majumder et al., "Pay-Cloak: A Biometric Back Cover for Smartphones: Facilitating secure contactless payments and identity virtualization at low cost to end users", Apr. 2017, IEEE Xplore, pp. 78-88 (Year: 2017).*

(Continued)

*Primary Examiner* — Neha Patel
*Assistant Examiner* — Nilesh B Khatri
(74) *Attorney, Agent, or Firm* — Buckley, Maschoff & Talwalkar LLC

(57) ABSTRACT

A method and system include providing a user interface associated with an issuer of an account; receiving, at the user interface, a request to generate a token associated with a user account; generating at least one token associated with the user account; authenticating one or more elements associated with the user account, wherein authentication may be one of prior to and subsequent to the generation of the at least one token; and receiving the at least one token. Numerous other aspects are provided.

10 Claims, 11 Drawing Sheets

(56) References Cited

U.S. PATENT DOCUMENTS

| | | | |
|---|---|---|---|
| 2014/0040126 A1* | 2/2014 | Andrews | G06Q 20/3572 |
| | | | 705/41 |
| 2014/0344153 A1 | 11/2014 | Raj et al. | |
| 2015/0032625 A1 | 1/2015 | Dill et al. | |
| 2015/0127547 A1 | 5/2015 | Powell et al. | |
| 2015/0199679 A1* | 7/2015 | Palanisamy | G06Q 20/34 |
| | | | 705/67 |
| 2015/0220914 A1* | 8/2015 | Purves | G06Q 20/36 |
| | | | 705/26.8 |
| 2015/0254653 A1* | 9/2015 | Bondesen | G06Q 20/385 |
| | | | 705/41 |
| 2015/0356560 A1* | 12/2015 | Shastry | G06Q 20/38215 |
| | | | 705/64 |
| 2016/0239842 A1* | 8/2016 | Cash | G06Q 20/3821 |
| 2016/0247156 A1* | 8/2016 | Hwang | G06Q 20/405 |
| 2016/0307183 A1* | 10/2016 | Faith | G06Q 20/3226 |
| 2016/0380981 A1* | 12/2016 | Arora | G06Q 20/34 |
| | | | 713/168 |
| 2017/0053277 A1* | 2/2017 | Dutt | G06Q 20/3223 |
| 2017/0255937 A1* | 9/2017 | Maddukuri | G06Q 20/3674 |
| 2017/0330188 A1* | 11/2017 | Canh | G06Q 20/385 |
| 2018/0285875 A1* | 10/2018 | Law | G06Q 20/4014 |
| 2018/0315042 A1* | 11/2018 | Rungta | G06Q 20/38215 |
| 2021/0264403 A1* | 8/2021 | Li | G06Q 20/363 |

OTHER PUBLICATIONS

"PCT Search Report and Written Opinion", International Searching Authority, dated Nov. 9, 2018 (Nov. 9, 2018), for International Application No. PCT/US2018/047842, 10 pp.

* cited by examiner

MyGlobalViewOnMyPaymentCredentials — 500

| | Stored On The Internet | | | Stored In Devices — 504 | | |
|---|---|---|---|---|---|---|
| Merchant name | Location | Sort of goods | Supported payment capabilities | Merchant account ID | Payment credentials | ACTION — 501 |
| EasyShop — 310 | LA | Furnitures | Online, In-app | 154114653267 | Card x1234 Token x5432 Ready for payment | Ask from merchant for authentication |
| ElectronicsPro — 312 | NYC | Computers | In-app | Phil.Smith | Card x1234 Token x9735 Ready for payment | None |
| WoawShop — 314 | LA | Games | Online | Phil.Smith@mymail.com | Card x5667 Token x9876 Ready for payment | Ask from merchant for authentication |
| OnlineMarket | LA | Groceries | Online, In-app | Phil.Smith@mymail.com | Card x1234 Token x5322 Ready for payment | Ask from merchant for authentication |
| ... | | | | | ... | ... |

FIG. 5

600 → MyGlobalViewOnMyPaymentCredentials

| Stored On The Internet | | | Stored In Device | | 604 → | |
|---|---|---|---|---|---|---|
| Device name | Location | Sort of goods | Device OS | Payment credentials | ACTION |
| Paul's tablet | Malibu area | Tablet | iOS | Digitization requested for card x1234 | Authenticate for creating credentials in device |
| Paul's Phone | LA area | Phone | iOS | Ready to use x1234 with token x5728 | None |
| Wawatch | LA area | Watch | iOS | Digitization requested for card x1234 | Authenticate for creating credentials in device |
| Paul's business phone | Malibu area | Phone | Android | Ready to use card x1234 with token x9567  Digitization requested for card x5678 | None  Authenticate for creating credentials in device |
| ... | ... | ... | ... | ... | ... |

FIG. 6

SYSTEMS AND METHODS FOR MINIMIZING USER INTERACTIONS FOR CARDHOLDER AUTHENTICATION

BACKGROUND

Payment card accounts are in widespread use. Payment cards and/or associated payment account numbers or payment tokens are frequently presented by consumers and business to pay for in-store purchase transactions, online shopping transactions, bill payments and other purposes.

Generally, tokenization involves replacing a sensitive data element (such as a payment card account number or "PAN") with another identification number or proxy (called the "token" or "payment token") that does not directly point to the corresponding payment card account. According to some example scenarios, tokens may be provisioned for merchant "card on file" applications and/or for other purposes and/or carrying other limitations on their use, such as limited to a consumer device, limited to use with a given merchant, originator or recipient, or to a particular channel, duration, time of day, transaction type, etc. If the token is submitted in connection with a transaction that is not originating from a card on file arrangement, the system will detect that the transaction is likely improper and will decline the transaction. Thus, for example, if a wrongdoer were to obtain access to the token and use it to make a counterfeit payment card, "swipe" transactions involving the fake card would be rejected by the payment card account system.

In other use cases, tokens may be provisioned to digital wallets, payment-enabled mobile devices, etc., with similar improvements in security as that described above in connection with the card on file example. That is, if the source of a payment card account system transaction is different from the type of potential source to which the token (used for the transaction) has been provisioned, the transaction may be subject to rejection for security purposes on the assumption that the token has been compromised and is being misused.

Consumers frequently associate their payment card information with different merchants (e.g., such as storing payment card information at retailers such as Amazon.com or the like). With increasing frequency, consumers are also associating their payment card information with different devices such as "Internet of things" or "IOT" devices. For example, a consumer may associate a payment account with a device such as a watch or a health monitoring device.

The present inventors have now realized that it may be desirable to provide methods and systems which allow users to manage the authentication across different devices, merchants, or the like.

BRIEF DESCRIPTION OF THE DRAWINGS

FIG. 5 is a user interface associated in accordance with some aspects of the present disclosure.

FIG. 6 is a user interface in accordance with some aspects of the present disclosure.

DETAILED DESCRIPTION

In general, and for the purpose of introducing concepts of embodiments of the present disclosure, a holder of a bank account (e.g., checking account, payment card account, savings account, investment account, current account, etc.) or a merchant having stored consumer payment information may request issuance of a token. The token may be generated and mapped to the bank deposit account (e.g., primary account number (PAN)) in question. The token may be provisioned to the token requestor in a form that allows the token to be presented during a payment transaction.

When a transaction is initiated by the user with the token, the token is translated, ultimately, to the user's deposit account. The deposit account is debited and a corresponding credit occurs for the benefit of the merchant.

Pursuant to some embodiments, a user of an Internet of Things (IOT) device (e.g., connected or "smart" device) may authenticate the device with an issuer (associated with a digital wallet, for example). Then a tokenization service provider generates and returns a token authentication value ("TAV") for the account held by the issuer. As used here the terms "TAV" and "token" may be used interchangeably. The user may, via a user interface provided by the issuer, authenticate other IOT devices via the first authenticated device.

Embodiments allow users to select multiple IOT devices to be tokenized by the originally authenticated IOT device. Further, embodiments enhance the tokenization of devices so that the single device may act as a centralized authentication/tokenization system for tokenizing user accounts.

Pursuant to embodiments, a user may elect to authenticate their account with multiple merchants from a single user interface provided by the issuer of the account (e.g., bank account, payment card account, etc.). Embodiments enhance the user experience by eliminating the need for users to further authenticate themselves with each merchant during tokenization.

Figure 1:
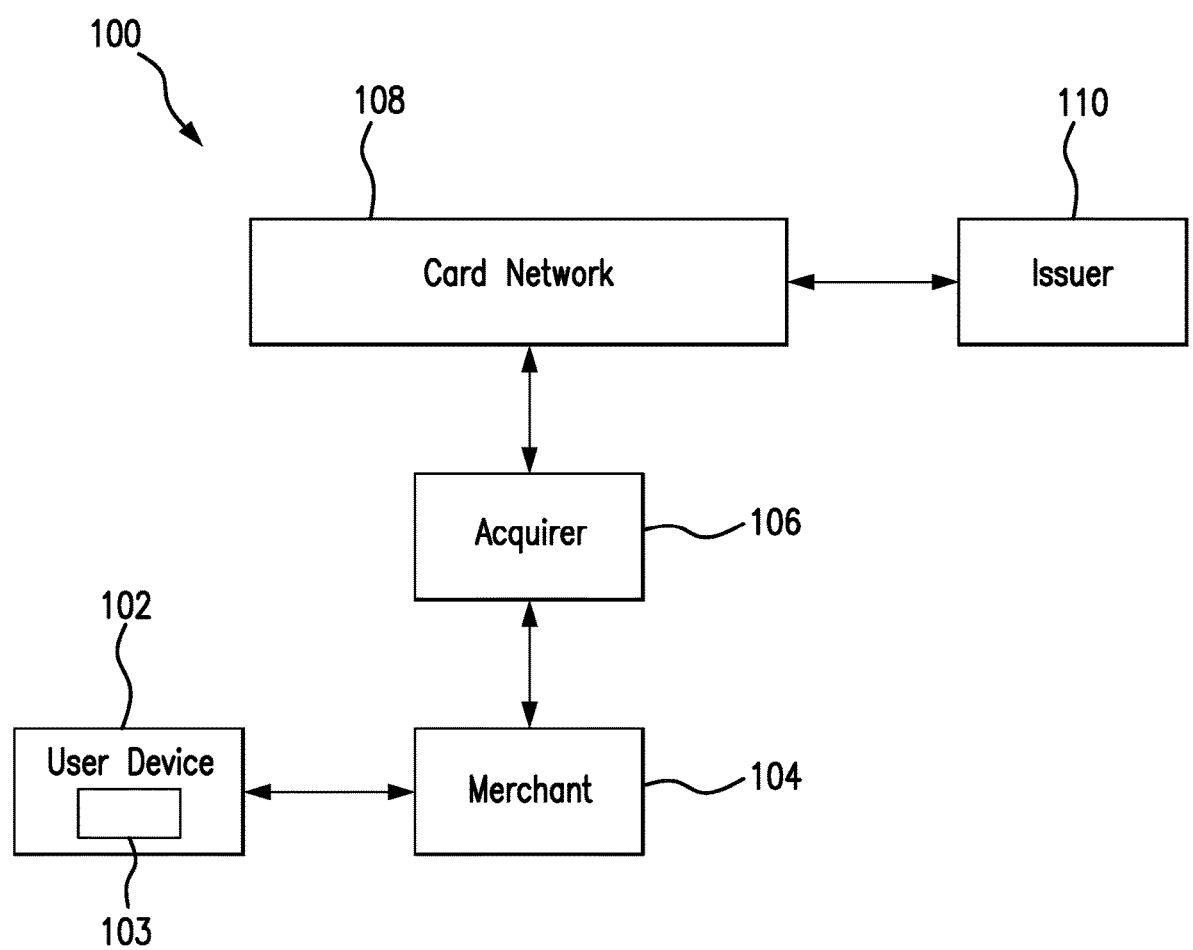
FIG. 1 is a schematic block diagram representation of a payment system, in accordance with some aspects of the present disclosure.
Figure 2:
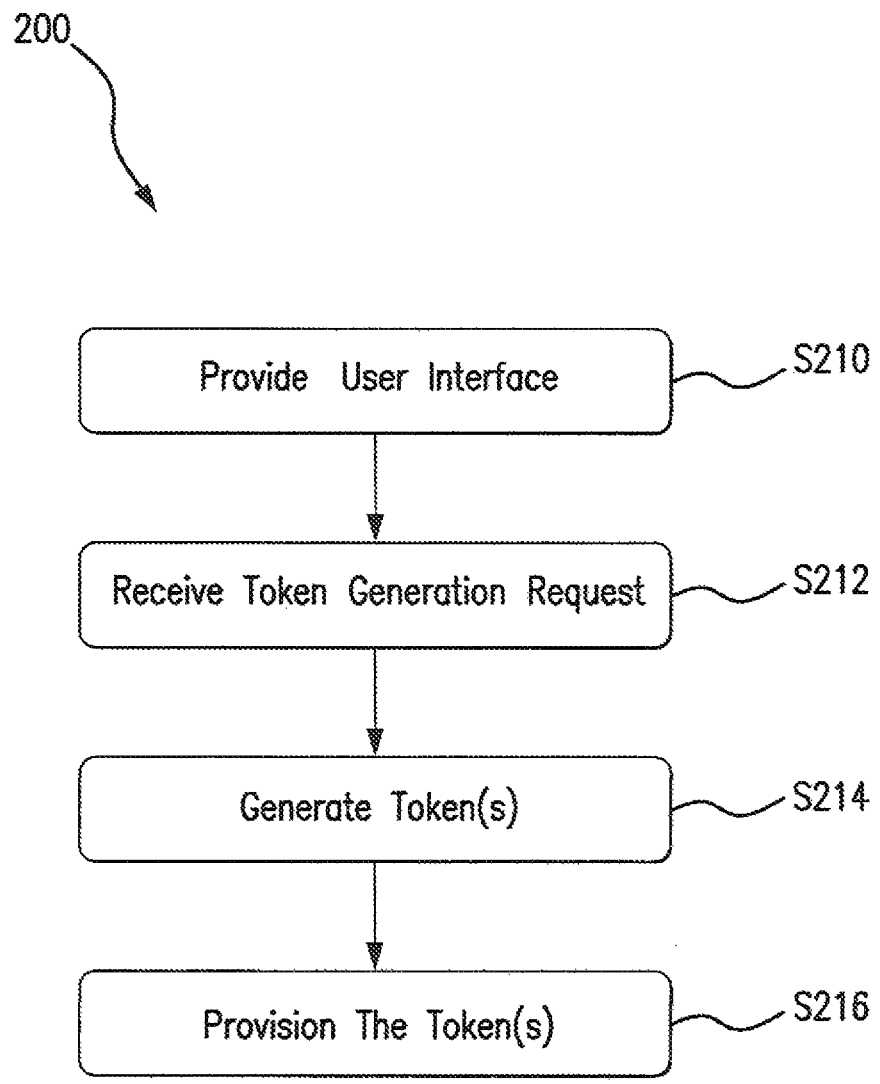
FIG. 2 is a flow chart in accordance with some aspects of the present disclosure.

FIG. 1 is a block diagram that illustrates a payment card account system 100.

The system 100 includes a user device 102 such as a magnetic stripe card, a payment IC (integrated circuit) card (contactless and/or contact), or a payment-enabled mobile device. Block 104 in FIG. 1 represents a merchant device such as a POS (Point of sale) terminal/card reader or a merchant website. The merchant device 104 may also be considered part of the payment card account system 100. The user device 102 may be presented to the merchant device 104 to consummate a purchase transaction and to permit the merchant device 104 to read/receive payment card account date (including, e.g., a payment account number) from the user device 102. In other situations, the merchant device 104 may be an e-commerce server computer, and the user device 102 may be a personal computer, a mobile device running a mobile browser, applications running on a PC or mobile device, etc.; in such situations, the user device 102 may engage in an online shopping session with an e-commerce website hosted by the merchant device 104.

A computer 106 operated by an acquirer (acquiring financial institution) is also shown as part of the system 100 in FIG. 1. The acquirer computer 106 may receive a payment account system authorization request message for the transaction from the merchant device 104. The acquirer computer 106 may route the authorization request message via a card network 108 to a server computer 110 operated by the issuer of a payment account that is associated with the account number obtained by the merchant device 104 (e.g., from the user device 102) and included in the authorization request message. The authorization response message generated by the payment issuer server computer 110 may be routed back to the merchant device 104 via the card network 108 and the acquirer computer 106.

One well known example of a card network is referred to as the "Banknet" system, and is operated by MasterCard International Incorporated, which is the assignee hereof.

The payment account issuer server computer 110 may be operated by or on behalf of a financial institution ("FI") that issues payment accounts to individual users such as the user who presented or operated the user device 102 referred to above. For example, the payment card issuer server computer 110 may perform such functions as (a) receiving and responding to requests for authorization of payment account transactions to be charged to payment accounts issued by the FI: and (b) tracking and storing transactions and maintaining account records.

The components of the system 100 as depicted in FIG. 1 are only those that are needed for processing a single transaction. A typical payment system may process many purchase transactions (including simultaneous transactions) and may include a considerable number of payment account issuers and their computers, a considerable number of acquirers and their computers, and numerous merchants and their devices, as well as a very large number of user devices.

Figure 3:
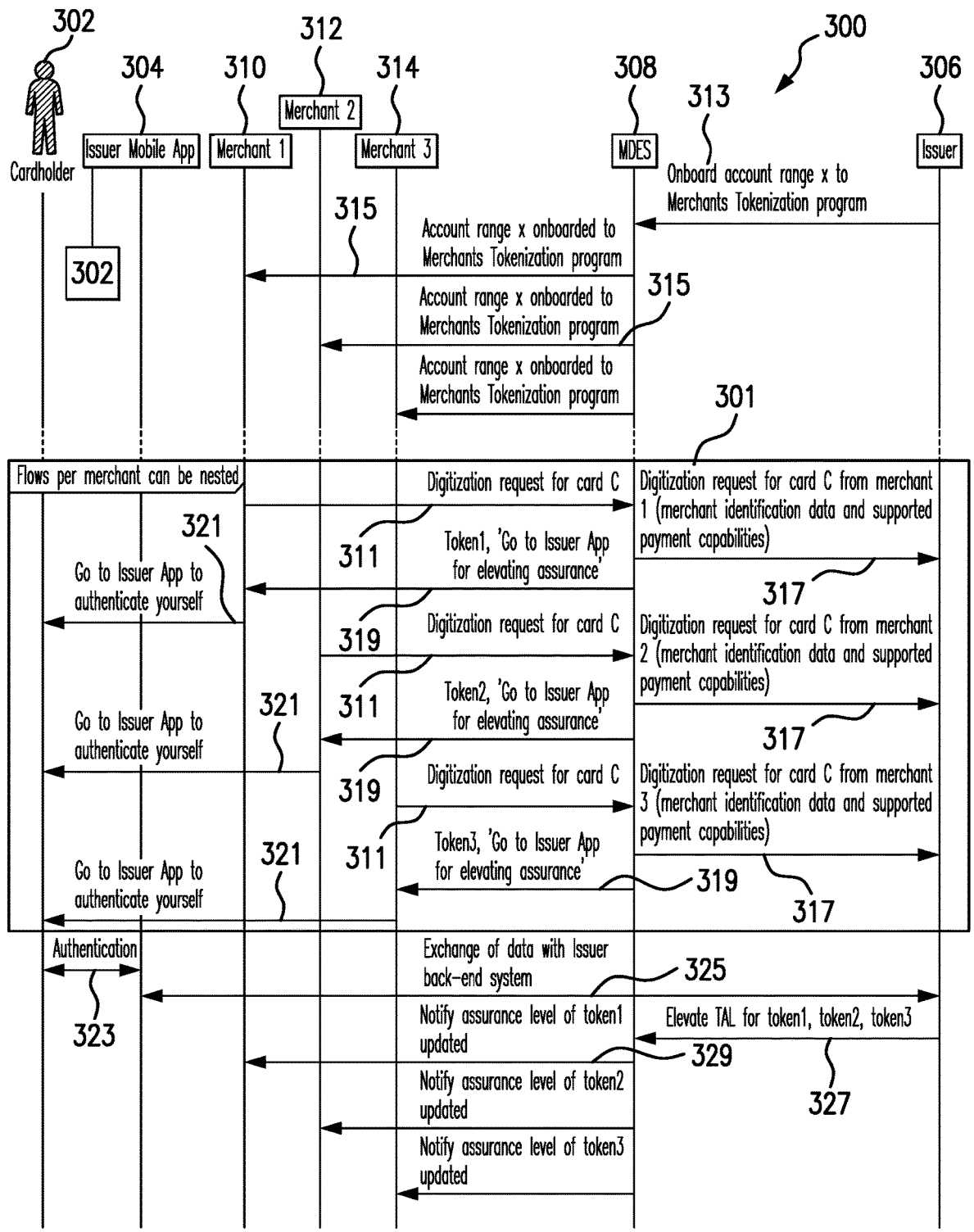
FIG. 3 is a block diagram of a card digitization system for Merchant stored tokens, in accordance with some aspects of the present disclosure.
Figure 4:
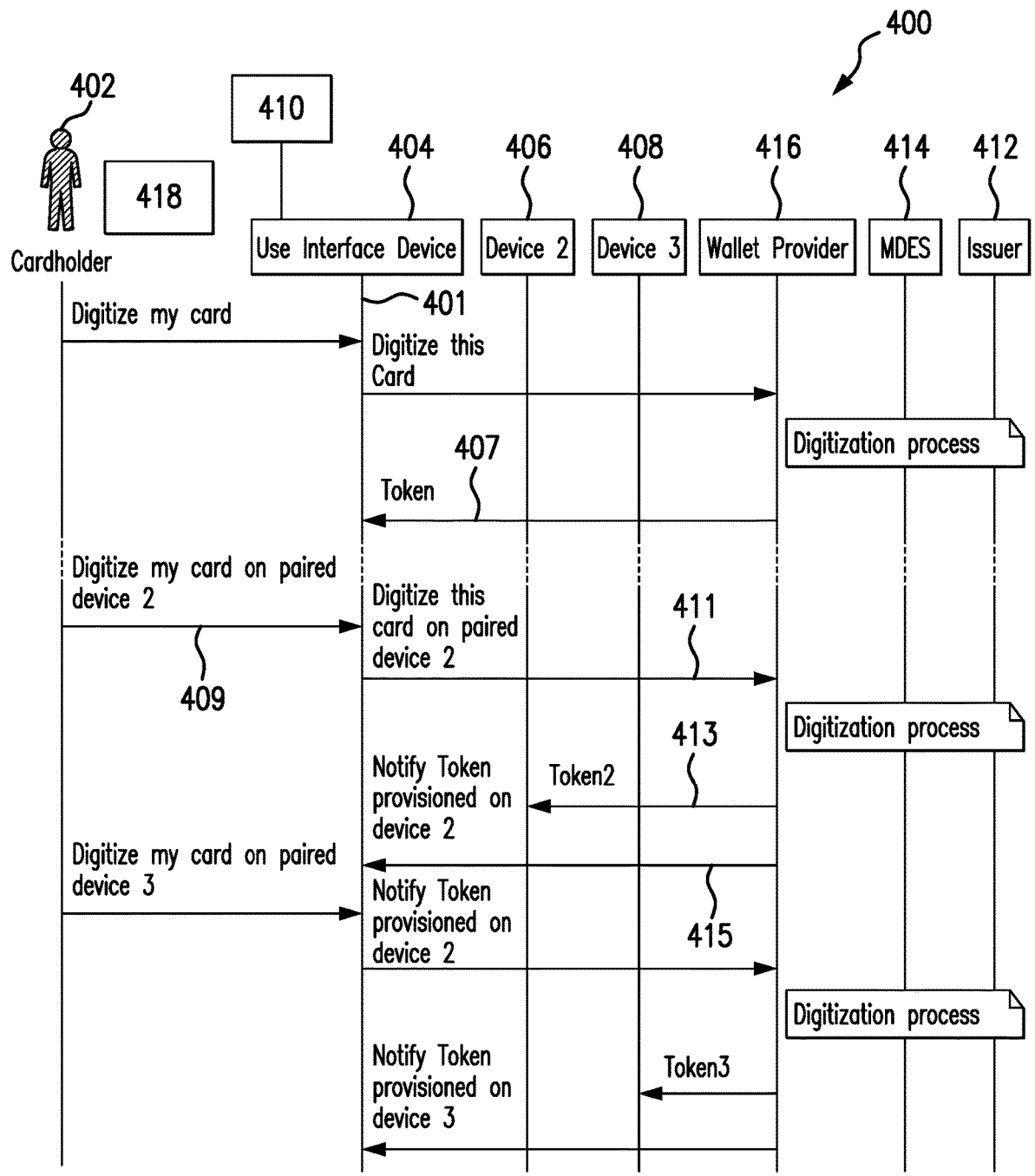
FIG. 4 is block diagrams of example computer systems that may perform digitization in paired devices non-equipped with user interfaces starting from a device presenting a consumer with a user interface.
Figure 7:
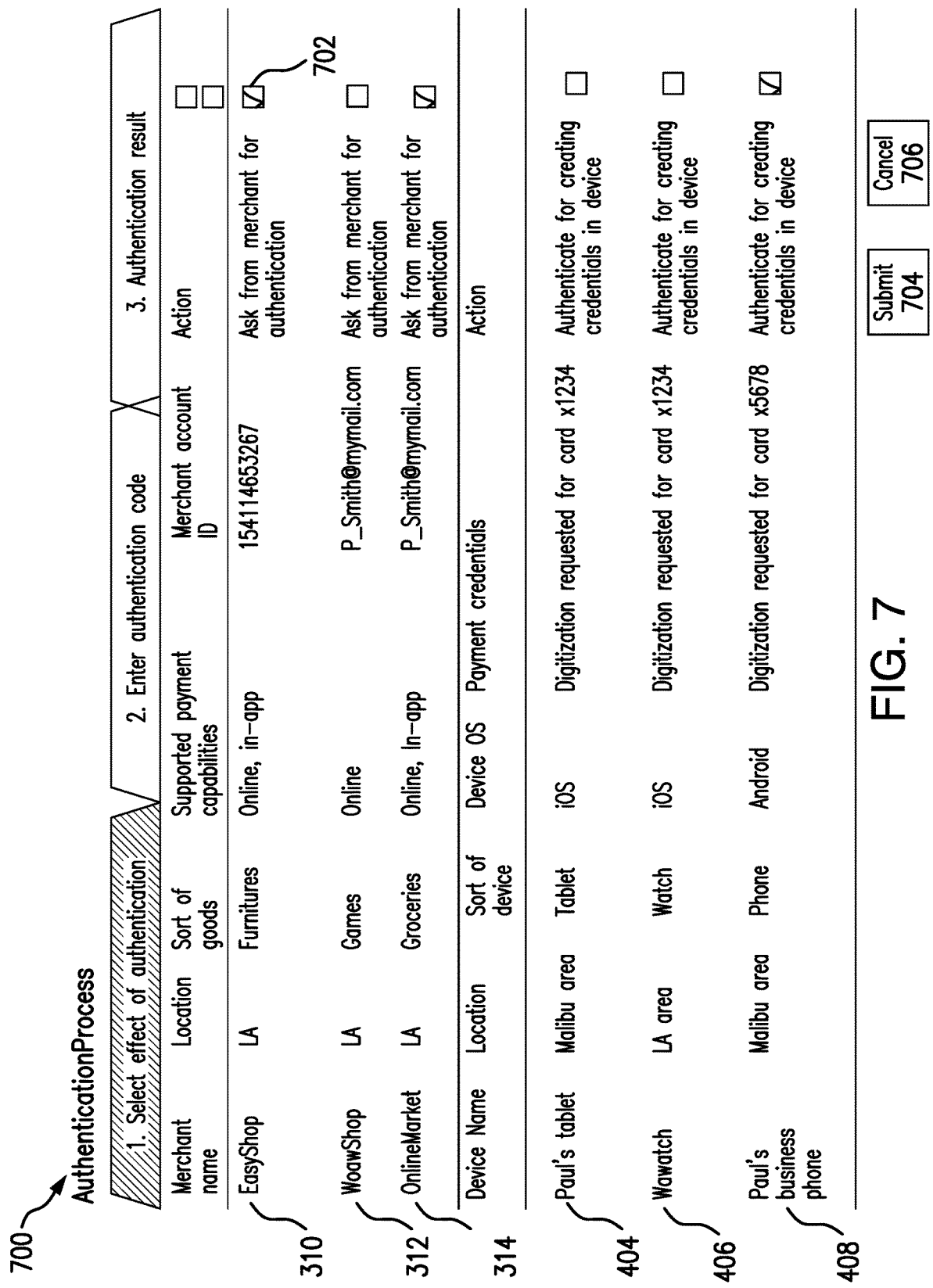
FIG. 7 is a user interface in accordance with some aspects of the present disclosure.
Figure 8:
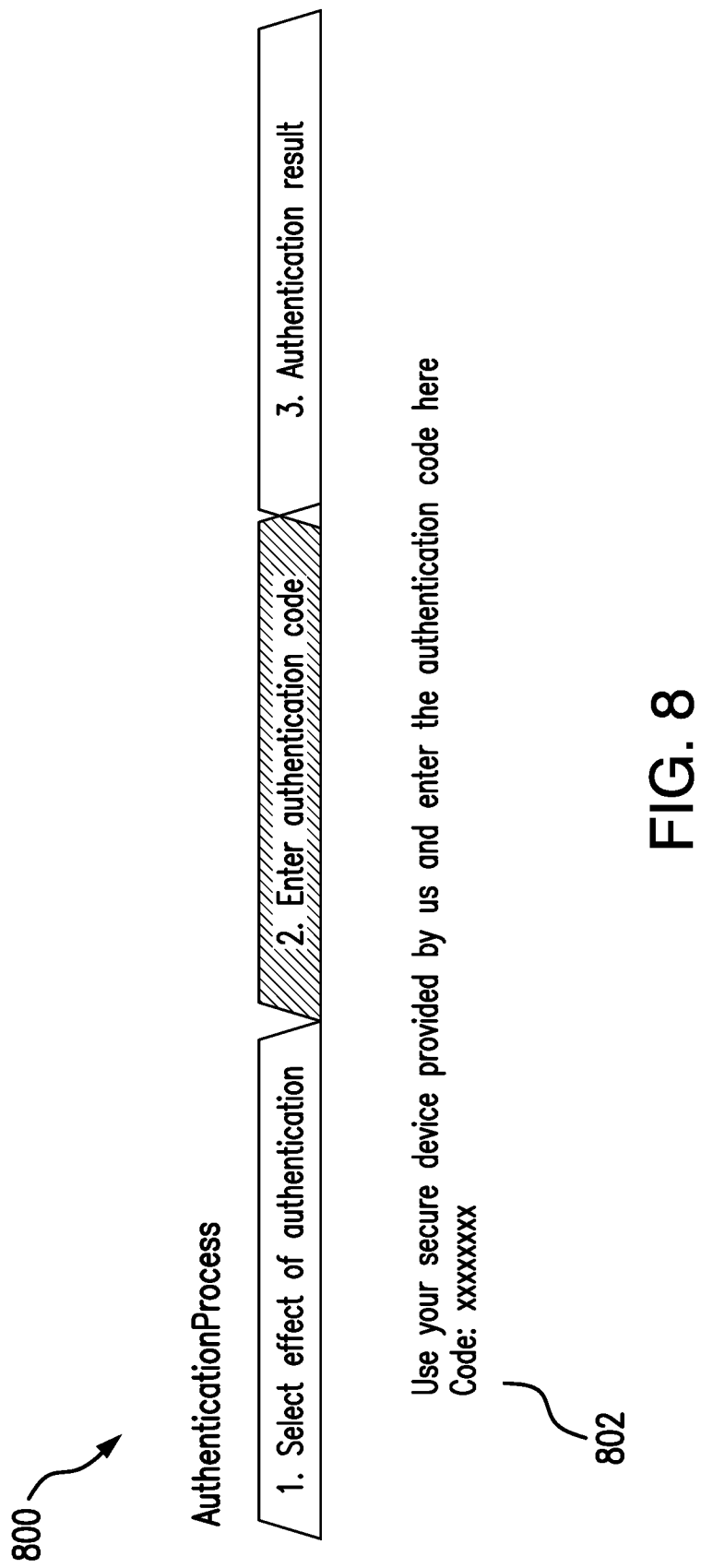
FIG. 8 is a user interface in accordance with some aspects of the present disclosure.
Figure 9:
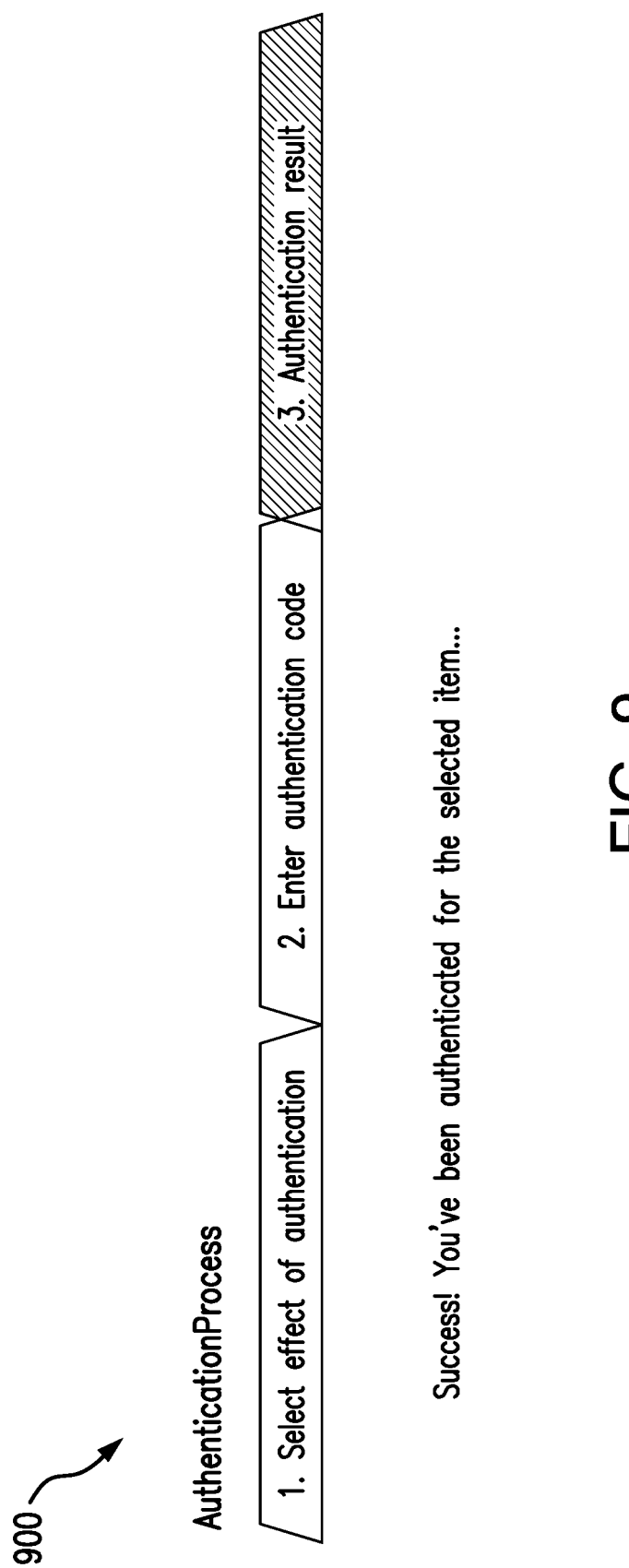
FIG. 9 is a user interface in accordance with some aspects of the present disclosure.

Turning to FIGS. 2-9, FIG. 2 illustrates a method 200 that may be performed, using User Interfaces (UI) of FIGS. 5-9, by some or all of the elements of the systems 100, 300, 400 described with respect to FIGS. 1, 3 and 4, and according to some embodiments of the present invention. The flow chart(s) described herein do not imply a fixed order to the steps, and embodiments of the present invention may be practiced in any order that is practicable. Note that any of the methods described herein may be performed using any suitable combination of hardware (e.g., circuit(s)), software or manual means. For example, a non-transitory computer-readable storage medium (e.g., a fixed disk, a floppy disk, a CD, a DVD, a Flash drive, or a magnetic tape) may store thereon instructions that, when executed by a machine, result in performance according to any of the embodiments described herein. In one or more embodiments, the systems 100, 300, 400 are conditioned to perform the process 200, such that the systems 100, 300 and 400 are a special purpose element configured to perform operations not performable by a general purpose computer or device.

Initially at S210, a user interface 500/600 (FIG. 5/6) is provided. The user interface 500/600 may be provided by an issuer mobile application 304 or in response to selection thereof at an issuer web site. In one or more embodiments, the issuer mobile application 304 may be provided by an Issuer 306 (such as a financial institution that issues a payment account, including, for example a digital payment account (e.g., Mastercard's Masterpass brand)).

Then, in S212, a request to generate a token 1104 (FIG. 11) associated with a user account is received. In one or more embodiments, the request may be received at a user interface 103 (FIG. 1) associated with the user device 102. In one or more embodiments, the request may be received from a merchant 104 or a user (e.g., customer) 304/402 via their user device 102 in a form of a device account number (e.g., ApplePay), as will be further described below with respect to FIGS. 3 and 4.

In one or more embodiments, one or more elements associated with the user account may be authenticated. The authentication may occur one of prior to and subsequent to the generation of the at least one token. In one or more embodiments, the element associated with the user account may be a merchant or a device. For example, a user may select a particular device (e.g., Paul's business phone) for digitization/authentication.

In one or more embodiments, the request may be received via any one of a plurality of channels, including but not limited to mobile phone applications, web based portals, merchant card on file systems, digital wallets, mobile browsers or web-browsing PCs, or over the counter. In one or more embodiments, the user interface 500/600 may be offered from a digital wallet associated with the Issuer (e.g., Masterpass offered by MasterCard), an Application Program Interface (API) that is exposed to Issuers 110 and may allow cardholders to be authenticated, or any other suitable entity.

At least one token 1104 associated with the user account is generated in S214. In one or more embodiments, the token may be generated by a tokenization service provider (e.g., MasterCard Digital Enablement Service or "MDES") 308/414, by a wallet provider 416, or by a third party Token Service Provider (TSP). The tokenization service provider 308/414 may process the request, and then send a request for authorization to the Issuer of the card to be tokenized, for example. When the Issuer approves, in some embodiments, the tokenization service provider 308/414 generates the token and provides the token to the token requestor. In one or more embodiments, the wallet provider 416 may manage the tokenization process from the Cardholder's perspective.

Pursuant to some embodiments, the tokenization service provider 308 may be configured to operate pursuant to at least one of the EMV Payment Tokenization Spec and the Payment Token Interoperability Standard (issued by MasterCard International Incorporated (the assigned hereof), Visa and American Express in November 2013).

In one or more embodiments, a token account number may be generated and mapped to the user's funding deposit account (which may be a current account or a savings account). As used herein, the user's funding deposit account may be associated with at least one of a bank account or a payment card account (e.g., all MasterCard brands—MasterCard, Cirrus and Maestro) and may be any type of credit, debit or pre-paid card. Other suitable payment cards may be used.

The token 1104 may be restricted to the channel for which it was requested. As described above, the token 1104 represents a generic payment card account 1102 that may be accepted within the domain of payment card networks for a given channel (i.e., the channel specified in the request and defined as acceptable for use of the token). The token 1104 may be a string of digits in a format used for payment card account numbers in a payment card account system. For example, the token 1104 may consist of 16 digits, like many payment card account numbers. The token 1104 may be mapped directly or indirectly to the user's bank deposit account.

Then at S216, the at least one token may be received or provisioned (i.e., made available). The provisioning may take a number of different forms depending on what the requested channel was. For example, the token may be downloaded to a mobile device for contactless payment at a point of sale and in-app payments. In other embodiments, the token may be stored "in the cloud" for remote accessing via a payment/wallet app in the payment-enabled mobile device. Alternatively, the token may be loaded into a merchant card on file system for subsequent payments for that specific merchant. As still another alternative, the token may be loaded to a digital wallet or used for instant issuance of a plastic payment card for use at any physical card accepting merchant point of sale.

Turning to FIG. 3, a system 300 block diagram depicts an example flow of one user account digitized in multiple merchant accounts. As shown, a number of entities or devices may interact to perform such a digitization process including, for example, a user 302 having a mobile device 302 including an Issuer mobile application 304 (as provided by an Issuer, via an authentication processor 1010), an Issuer 306 (such as a financial institution that issues the payment account), a tokenization service provider (shown for illustrative purposes as the MasterCard Digital Enablement Service or "MDES") 308 and a first merchant 310, a second merchant 312 and a third merchant 314.

In the illustrative digitization process, the following steps are illustrated. In one or more embodiments, prior to the start of the digitization process, the Issuer 306 and merchants (310, 312, 314) enroll with the tokenization service provider 308. Then at 311, the token 1104 is requested from the tokenization service provider 308. The token 1104 may be requested by one of the merchants (310, 312, 314), a commerce platform (not shown) or a user 302 (e.g., via a mobile app/bank app/merchant site browsing). The inventors note that with the merchant and commerce platform request, the user need not be present. The token may be requested by other suitable token requestors. In one or more embodiments, the token request may be prompted by at least one of: (1) a process (e.g., a batch job or when a user uses the payment account) initiated by the merchant (310, 312, 314) to request tokens for at least a portion of the user payment accounts stored at the merchant; and (2) the receipt at the merchant of notification that a particular account range is available for tokenization. For example, as shown in FIG. 3, the Issuer 306 sends a message 313 to the tokenization service provider 308 that accounts 1102 (FIG. 11) stored with the Issuer in a particular account range are available for tokenization. In one or more embodiments, there may be a request to set up an account range for tokenization. In one or more embodiments, the Issuer 306 may talk to the tokenization service provider 308 to have some of the account ranges set up as ready for tokenization. In turn, the tokenization service provider 308 may forward that message to each merchant where the account number has been stored in 315.

In one or more embodiments, the user 302 is unaware that the merchant (310, 312, 314) initiated a request to digitize their account information. This may enhance the user experience because the digitization process may occur behind the scene and the user does not have to wait for that process to be completed. In one or more embodiments, the Merchant/Commerce platform may decide that user approval may not be needed to tokenize the user's card(s).

After the token 1104 is requested from the tokenization service provider 308 at 311, the tokenization service provider 308 may send a digitization request 301 to the Issuer 306 in 317. As used herein, with "tokenization," the tokenization service provider may generate and allocate a unique token for a payment card account number or bank account number, which is specific to the platform or instance, such as a particular wallet application on a particular device. If the same payment card account number or bank account number is tokenized for a different application or device, the tokenization service provider may generate and issue a different token. Similarly, if two different payment card account numbers and/or bank account numbers for the same cardholder are tokenized for the same wallet application and device, the tokenization service provider may generate and issue two token: one for each account. As used herein, with "digitization," the tokenization service provider prepares the provisioning package, generates the cryptographic keys, personalization scripts and data for provisioning the token to the target, such as a device's settings (e.g., Secure Element), a MasterCard Cloud-Based Payments (MCBP) application or a secure server. In one or more embodiments, the digitization request 301 may include at least one of the user account number 1102, merchant identification data/token entity 1106, supported payment capabilities, merchant name, merchant location, type of goods sold, supported payment capabilities (e.g., online, in-app), merchant account ID (e.g., user's account on the merchant site), and any other suitable information.

With respect to the example described above where the merchant 306 requests the token 1104 in response to the merchant-initiated process, the tokenization service provider 308 may determine whether each user account for which a token is requested is available for tokenization prior to sending the digitization request to the Issuer 306. In one or more embodiments, the determination may be based on issuer onboarding information previously configured. When the tokenization service provider 308 determines the user account for which the token is requested is unavailable for tokenization, the tokenization service provider 308 may indicate to the merchant that tokenization is unavailable.

Then, in response to the request at 317, the Issuer 306 may approve the digitization of the account 1102 and then the tokenization service provider 308 may generate a token 1104. In one or more embodiments, the Issuer 306 may want to control the digitization of an account, per account, and also at the moment of the digitization. The Issuer 306 may determine as part of the approval whether an account is or is not in good standing, or whether a user is subscribed or unsubscribed. The token 1104 may then be provided to the requesting merchant (310, 312, 314) in 319. As described above, the token 1104 may be restricted to the channel (e.g., merchant) for which it was requested. As shown in FIG. 3, the single account may be associated with three tokens 310, 312, 314, where each token is associated with a specific merchant. While in FIG. 3, the single account is shown associated with three tokens, the single account may be associated with any suitable number of tokens (e.g., more or less than three). In one or more embodiments, the token 1104 may be provisioned as active to be used straight in replacement of a card number on file. In one or more embodiments, after tokenization, when a payment is initiated by the user 302, the merchant may submit the provisioned token instead of the payment account number.

In one or more embodiments, the provision of the token 1104 may include or be associated with an associated assurance level or method. In one or more embodiments, the token assurance level may be from 00-99, or any other suitable indicator, and may indicate a rate of certainty the tokenization is held by the correct account-holder. In one or more embodiments, during a transaction, the assurance level may be assigned by the tokenization service provider 308 when generating the token, based on how the tokenization took place. The assurance level may be sent to the Issuer in payment transaction requests, and the Issue may decide to approve or decline the payment based on assurance level value.

In one or more embodiments, the assurance level may be based on one or more checks performed during the digitization process. For example, the token assurance level may be determined as a result of the type of identification and verification (ID &V) procedures used (e.g., CVC, procedures like those used in connection with payment card account provisioning may be employed), if/how the cardholder has been authenticated (e.g., questions on the phone, activation code sent to recognized cardholder mobile phone, etc.) and the entity that performed the procedures. In one or more embodiments, the token assurance level may be influenced by other factors, such as token location. In one or more embodiments, the token assurance level value may be defined by the tokenization service provider 308.

In one or more embodiments, the tokenization service provider 308 may update a token assurance level value of active tokens when the user 302 is further authenticated to indicate a higher expected approval rate.

In one or more embodiments, after receipt of the token assurance level, the merchant (310, 312, 314) may decide to obtain a higher assurance level. In one or more embodiments, the merchant (310, 312, 314) may prompt the user 302 in 321 to provide authentication information in an effort to obtain the higher assurance level, as determined by the tokenization service provider 308. It is noted that the tokenization service provider 308 may diminish the assurance level as well. The change in assurance level may be based on checks performed at some point in time, or based on other suitable criteria. In one or more embodiments, the user authentication may be performed by the Issuer. The tokenization service provider 308 may, in one or more embodiments, rely on the Issuer for sending an activation code to the user for authentication purposes, and then the tokenization service provider may validate the code when it is received from the merchant (e.g., user may be prompted to enter the code provided by the Issuer at the merchant. In this case the tokenization service provider may generate the activation code and determine whether the code received from the user via the merchant is the same code sent to the issuer).

In one or more embodiments, the user 302 may be prompted to open the Issuer Mobile App 304 to authenticate himself. In one or more embodiments, the user 302 may be prompted when they open the Issuer Mobile App 304 for using an issuer service not related to authentication (e.g., performing a bank transfer), or because the Issuer sent a request to the user to open the Issuer Mobile App 304 because there are pending action items. In one or more embodiments, the user 302 may be prompted at any time after the merchant (310, 312, 314) receives the token 1104 and assurance level. For example, the user 302 may be prompted when the merchant (310, 312, 314) first receives the token 1104 and assurance level; the user 302 may be prompted when the user 302 initiates a transaction at the merchant (310, 312, 314); the user 302 may be prompted as part of a merchant procedure (e.g., a batch job).

In one or more embodiments, the user 302 may be prompted 302 when the user 302 opens the Issuer Mobile App 304 to provide authentication information for a different merchant. For example, the user 302 may have initiated a transaction via the Merchant 310 site, and then be prompted to open the Issuer Mobile app 304 to complete the transaction. As shown in the user interface 500 in FIG. 5, the option to select authentication for Merchant1 310 is available. Additionally, the option to provide authentication information for Merchant2 312 is also available via the same interface. The user interface 500 may include a listing of all pending authentication requests from other merchants. In one or more embodiments, the user 302 may select (e.g., click) on any of the actions 501 and may then be transferred to an authentication user interface page 700 (FIG. 7), as discussed further below. This may enhance the user experience, as the user is provided with power as to whether they want to increase the assurance level for the merchant. In one or more embodiments, the user interface 500 may also provide an option for the user to select whether they want their account information digitized by a particular merchant. When the user indicates, e.g., via selection of a selector (not shown), they do not want the merchant to store their account information in token-form, the merchant may remove the account information from their file system. In this way, the user experience is again enhanced by being able to control who stores their account information and in what form. In one or more embodiments, the UI 500 may also include an option to authenticate one or more devices by selection of a tab 504, as discussed further below.

At 323, user authentication may take place. This may be done in any manner that the Issuer 306 deems to be prudent. For example, submission and verification of a PIN may be employed, or the user may submit and the Issuer 306 may verify a biometric measure. More generally, if deemed appropriate or necessary, ID&V (identification and verification) procedures like those used in connection with payment card account provisioning may be employed to obtain reasonable assurance of user authentication. In one or more embodiments, the user 302 may be prompted to enter the authentication information to the Issuer Mobile App 304, and the Issuer Mobile App 304 may exchange the data with the Issuer 306 in 325. For example, in FIG. 7, the user 302 agrees to further authentication from merchant1 310 and merchant 314, but not merchant2 312, via selection of an indicator 702 and selection of a submit button 704. In one or more embodiments, the user 302 may cancel the authentication via selection of a cancel button 706. Then, after submission, UI 800 shown in FIG. 8 may be displayed to prompt the user 302 to enter authentication information in a user-entry field 802.

In one or more embodiments, the user 302 may receive a response 900 (FIG. 9) to the authentication request, indicating the authentication was one of successful or unsuccessful. In one or more embodiments, the tokenization assurance level elevation may be performed as a consequence to a successful authentication.

In one or more embodiments, the authentication information may be sent from the Issuer Mobile App 304 directly to the Issuer 306.

The Issuer 306 may then decide whether to elevate the token assurance level (TAL). The Issuer 306 sends an elevation decision to the tokenization service provider 308 in 327. The tokenization service provider 308 may then notify each merchant whether the assurance level has been updated in 329. In one or more embodiments, when the request for a higher assurance level is declined, the original assurance level is maintained or the original assurance level may be downgraded.

The inventors note that while the digitization of one user account is shown in FIG. 3, a user may have 1, 2, 3 . . . n payment cards on each merchant's file, and the merchant may want to tokenize or authenticate one or more of user accounts at the same time.

Turning to FIG. 4, a system 400 block diagram depicts an example flow of digitization of one account to multiple devices. As shown, a number of entities or devices may interact to perform such a digitization process including, for example, a user 402 having a first user interface device 404, a second interface device 406, and a third interface device 408, where at least one of the user interface devices (404, 406, 408) includes an Issuer mobile application 410 (as provided by an Issuer), and is associated with an Issuer 412 (such as a financial institution that issues the payment account), a tokenization service provider (shown for illustrative purposes as the MasterCard Digital Enablement Service or "MDES") 414 and a digital wallet provider 416 (e.g., a MasterPass Wallet).

In the illustrative digitization process, the following steps are illustrated. In one or more embodiments, prior to the start of the digitization process, the Issuer 412 and the wallet provider 416 enroll with the tokenization service provider 414, and the user 402 enrolls with the digital wallet provider 416 in a typical way, and then has a wallet account from the digital wallet provider 416. The wallet account may be usable with a device, and the tokens may be "tied up" or associated with the device. In one or more embodiments, the tokenization service provider 414 may define an interface with the Issuer 412 to provide the Issuer 412 with an authentication request and data about devices (or merchants/commerce platform per FIG. 3), calling for an action from the user 402. The Issuer 412 may expose the authentication requests in the issuer mobile application 410.

Then the user 402 requests the digitization of a payment account 418 for association with the first user interface device 404 in 401, to create payment capability with the first user interface device 404. In one or more embodiments, the request 401 may be via the Issuer mobile application 410. In one or more embodiments, the user interface of the Issuer mobile application 410 may be the same or different from the user interface of the Issuer mobile application 304 described above with respect to FIG. 3.

In one or more embodiment, the request may be received at the wallet provider 416. The wallet provider 416 may perform processing to authenticate the user (to confirm they are authorized to interact with the wallet). After the wallet provider 416 authenticates the user 402, the wallet provider 416 may interact with the tokenization service provider 414 in 403. In one or more embodiments, the tokenization service provider 414 may then interact with the Issuer 412 to associate payment account information with the request message to tokenize the payment account at 405. The Issuer 412 may approve or decline the request. When the Issuer 412 approves the request, an approval message may be sent to the tokenization service provider 414 (not shown), who then may generate and provide the token information 1104 to the requesting user interface device in 407.

The user 402 may then interact with the first user interface device 404 to launch the Issuer mobile application 410 with an intent to digitize the payment account associated with the first user interface device 404 with the second user interface device 404 in 409, such that the requestor (e.g., first user interface device 404) is not where the token will be pushed (e.g., second user interface device 406). For example, the first user interface device 404 may be a phone having the capability (e.g., typing capability) to use the Issuer mobile application 410, while the second user interface device 406 may be a watch or ring, without capability to use the Issuer mobile application 410. Of note, the payment account that is attempted to be digitized on the second user interface device may or may not already be digitized on the first device. In one or more embodiments, the digitization may be the payment account associated with the first user interface device 404 of a different payment account.

In one or more embodiments, the first user interface device 404 and any other user interface device (e.g., 406, 408) that digitization is being requested for via the first user interface device 404 may be paired or linked. In one or more embodiments, the pairing or linking may allow first user interface device 404 to provide appropriate authentication information about the other user interface device (e.g., 406, 408) to the wallet provider 416 to authenticate the other user interface device (e.g., 406, 408). For example, each of the first user interface device 404 and the second user interface device 406 may include a unique ID and this information may be used by the first user interface device 404 to digitize a payment account on the second user interface device 406. In one or more embodiments, a back-end (e.g., cloud) may recognize that both the first and second user interface devices are linked to the same cardholder account and may use one device to digitize the other. In one or more embodiments, device linkage may be established by the wallet provider, for example, when they see the same wallet account is open using different devices. The linkage also may be established by an Issuer based on the device itself (e.g., a unique ID) as it was registered or based on what device is used to open the Issuer online banking services, for example. In one or more embodiments, the authentication may occur before a token is created. For example, if the Issuer 412 indicates the cardholder 402 may need further authentication, the token may not be created. In one or more embodiments, the user 402 may view the device targeted by the digitization request (e.g., 406) and any other devices that may take the benefit of a common authentication (e.g., 408) (FIG. 6). In one or more embodiments, the user 402 may formally approve or reject a digitization based on information displayed on the UI 600. In one or more embodiments, it may not be necessary for a token to be provisioned on the first user interface device 404 before a token may be created on a paired device (e.g., second user interface device 406).

A sample user interface 600 is shown as the first screen of FIG. 6. The user selects the second user interface device 404 to associate the digitized card with. In one or more embodiments, the user 402 may select (e.g., click) any of the actions 604 and may then be transferred to the authentication page 700 (FIG. 7) for authentication. The user 402 agrees to further authenticate device 3 408, via selection of the indicator 702 and selection of a submit button 704. In one or more embodiments, the user 402 may cancel the authentication via selection of the cancel button 706. Then, after submission, UI 800 shown in FIG. 8 may be displayed to prompt the user 402 to enter authentication information in the user-entry field 802. In one or more embodiments, the user interfaces 500 and 600 shown in FIGS. 5 and 6, respectively, may be combined into a single UI display (not shown). The authentication UI 800 in FIG. 8 and UI 900 of FIG. 9 described with respect to the UI 600 of FIG. 6, may also be applied to authentication as described above with respect to FIG. 5, in one or more embodiments.

In one or more embodiments, after successful authentication per the Issuer, the tokenization service provider then provides tokens, which are sent to the appropriate device in 407 and 413. Additionally, in one or more embodiments the user 402 may receive a response 900 (FIG. 9) to the authentication request, indicating the authentication was one of successful or unsuccessful.

Turning back to the digitization of the second user interface device via the first user interface device, the digitization request is sent to the wallet provider 416 in 411, as described above with respect to the digitization request for the first user interface device 404. As described above with respect to the digitization request for the first user interface device, the payment account is digitized as a device token and provisioned to the second user interface device 406 in 413. In one or more embodiments, the wallet provider 416 may notify in 415 the requester (e.g., the first user interface device 404) that the token was provisioned to the second user interface device.

In one or more embodiments, the user 402 may request, via the first user interface device 404 the digitization of the payment account with one or more other user interface devices (e.g., second user interface device 406 and third user interface device 408). The digitization process for third user interface device 408 may be the same for the second user interface device 406, described above. In one or more embodiments, the sample user interface 700 may allow the user 402 to simultaneously digitize the payment account on more than one user interface device. In one or more embodiments, the user may digitize the same or different payment account on more than one user interface device serially.

Figure 10:
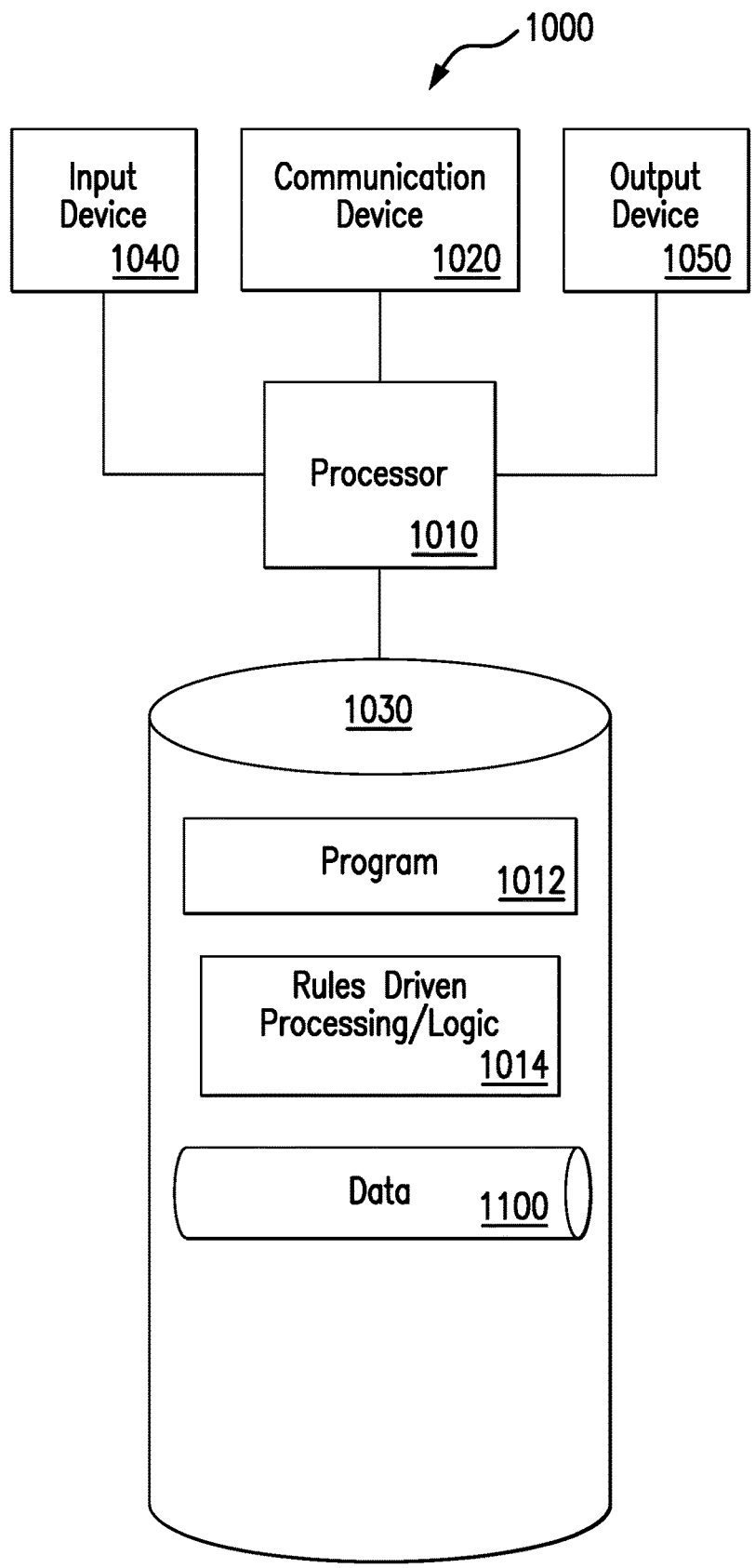
FIG. 10 is a block diagram of a system, in accordance with some aspects of the present disclosure.

Note that the embodiments described herein may be implemented using any number of different hardware configurations. For example, FIG. 10 illustrates an Authentication Platform 1000 that may be, for example, associated with the system 100 of FIG. 1. In one or more embodiments, the platform 1000 may be stored at the Issuer 110. The Authentication Platform 1000 may, in its hardware aspects, resemble a typical server computer and/or mainframe computer, but may be controlled by software to cause it to function as described herein. The Authentication Platform 1000 comprises an authentication processor 1010, such as one or more commercially available Central Processing Units (CPUs) in the form of one-chip microprocessors, coupled to a communication device 1020 configured to communicate via a communication network (not shown in FIG. 10). The communication device 1020 may be used to communicate, for example, with one or more users or computers or other devices (such as other components of the system 100). The communication device 1020 may comprise numerous communication ports (not separately shown), to allow the Authentication Platform 1000 to communicate simultaneously with a number of other computers and other devices, including communications as required to simultaneously handle numerous interactions with other devices and/or numerous transactions.

The Authentication Platform 1000 further includes an input device 1040 and an output device 1050. The input device 1040 may comprise one or more of any type of peripheral device typically used to input data into a computer. For example, the input device may include a computer mouse and/or keyboard to enter information. The output device 1050 may comprise, for example, a computer monitor or printer to output a transaction information report.

The processor 1010 also communicates with a storage device/memory 1030. The storage device 1030 may comprise any appropriate information storage device, including combinations of magnetic storage devices (e.g., a hard disk drive), optical storage devices such as CDs and/or DVDs, mobile telephones, and/or semiconductor memory devices such as Random Access Memory (RAM) devices and Read Only Memory (ROM) devices, as well as so-called flash memory. Any one or more of such information storage devices may be considered to be a computer-readable storage medium or a computer usable medium or a memory.

The storage device 1030 stores a program 1012 and/or authentication platform logic 1014 for controlling the processor 1010. The processor 1010 performs instructions (which may be referred to as computer readable program code means) of the programs 1012, 1014, and thereby operates in accordance with any of the embodiments described herein to provide desired functionality. For example, the processor 1010 may receive an authentication request which may then be analyzed by the processor 1010 to automatically determine whether the device should receive a token.

The programs 1012, 1014 may be stored in a compressed, uncompiled and/or encrypted format. The programs 1012, 1014 may furthermore include other program elements, such as an operating system, a database management system, and/or device drivers used by the processor 1010 to interface with peripheral devices.

As used herein, information may be "received" or "retrieved" by or "transmitted" to, for example: (i) the Authentication Platform 1000 from another device; or (ii) a software application or module within the Authentication Platform 1000 from another software application, module, or any other source.

In some embodiments (such as shown in FIG. 10), the storage device 1030 further stores an authentication map or database 1100. Some examples of databases that may be used in connection with the Authentication Platform 1000 will now be described in detail with respect to FIG. 11. Note that the database described herein is only an example, and additional and/or different information may actually be stored therein. Moreover, various databases might be split or combined in accordance with any of the embodiments described herein.

Figure 11:
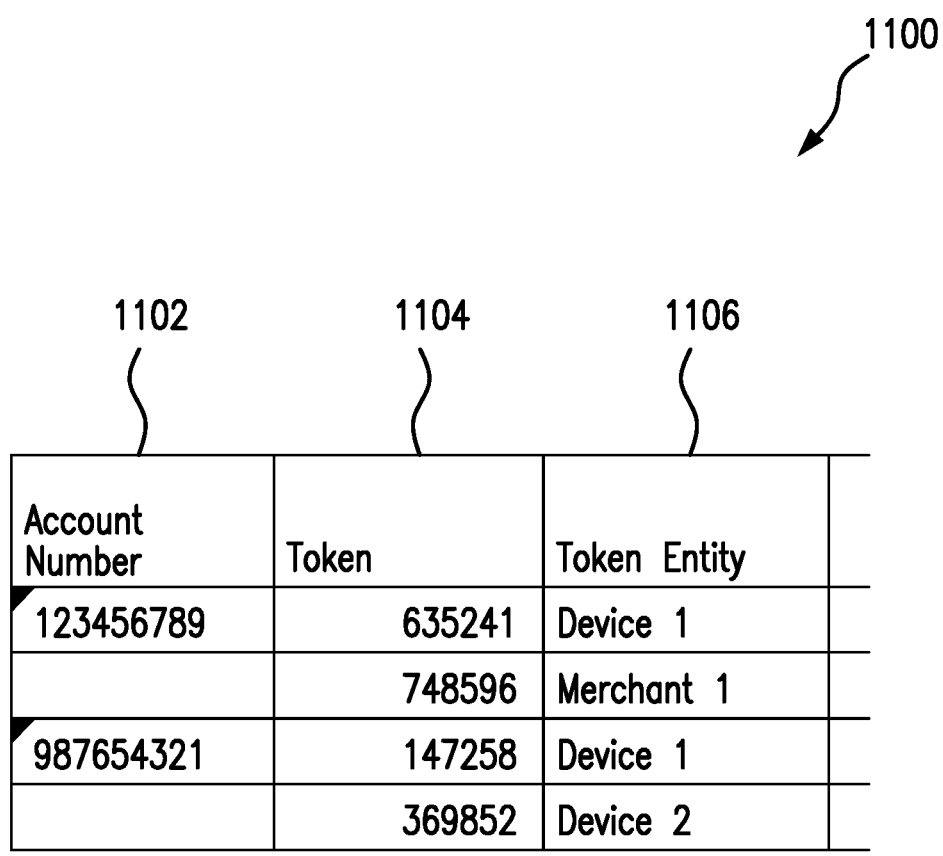
FIG. 11 is a table in accordance with some aspects of the present disclosure.

Referring to the authentication database in FIG. 11, a table 1100 is shown that represents the authentication database 1100 that may be stored in memory 1030 (Authentication Platform 1100) according to some embodiments. The table 1100 may include, for example, the account number 1102 for which digitization is sought. The table 1100 may define fields 1102, 1104 and 1106 for each of the entries. The fields 1102, 1104 and 1106 may, according to some embodiments, specify: a token number 1104 and a token entity 1106 to which the token is provided. Other suitable fields may be used in addition to, or instead of, the fields listed herein. The database 1100 may be created and updated, for example, based on information electrically received on a periodic basis.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, an authentication module. The method steps can then be carried out using the distinct software modules and/or sub-modules of the system, as described above, executing on one or more hardware processors 1010 (FIG. 10). Further, a computer program product can include a computer-readable storage medium with code adapted to be implemented to carry out one or more method steps described herein, including the provision of the system with the distinct software modules.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
providing a user interface associated with an issuer of an account;
launching, in response to a user request, a digitization application on a first user interface device, the first user interface device having a first unique identifier;
receiving, at the first user interface device, a user request for digitization of a user account associated with the first user interface device;
transmitting the received user request for digitization to a wallet provider;
authenticating the user via the wallet provider;
receiving, at the first user interface device, a token, in response to approval of the issuer of the account to tokenize the account;
receiving, from the first user interface device, a request at the issuer of the account to digitize the user account associated with the first user interface device on a second user interface device, the second user interface device having a second unique identifier, wherein digitization comprises the preparation, by a tokenization service provider, of a provisioning package, generation of cryptographic keys, personalization scripts and data for provisioning a device token for the user account associated with the first user interface device to the second user interface device, wherein the device token is specific to the second user interface device and the digitization is based on the first unique identifier and the second unique identifier;
providing the first unique identifier and the second unique identifier to the wallet provider;
linking the first user interface device to the second user interface device by the first unique identifier and the second unique identifier, wherein linking further comprises determining, via a wallet provider, the first user interface device and the second user interface device are both linked to the user account, the determination based on the wallet provider identifying the same user account is open using the first user interface device and the second user interface device;
after the linking, receiving, at the wallet provider from the first user interface device, authentication information for the second user interface device;
authenticating, at the wallet provider, the second user interface device based on the linking and the received authentication information for the second user interface device;
approving, by the issuer of the account, the second user interface device to receive the device token;
generating the device token by the token service provider associated with the user account in response to the approval;
provisioning the generated device token to the second user interface device, wherein provisioning of the device token to the second user interface device digitizes the second user interface device; and
receiving the provisioned device token at the second user interface device.

2. The method of claim 1, wherein the device token is for association with at least one second user device.

3. The method of claim 1, further comprising: receiving, at the first user interface device, notification that the device token was received by the second user interface device.

4. A system comprising:
a first user interface device;
a memory for storing program instructions;
an authentication processor, coupled to the memory, and operative to execute program instructions to:
provide a user interface associated with an issuer of an account;
launch a digitization application on the first user interface device, the first user interface device having a first unique identifier;

receive, at the first user interface device, a user request for digitization of a user account associated with the first user device;

transmit the received user request for digitization to a wallet provider;

authenticate the user via the wallet provider;

receive, at the first user interface device, a token in response to approval of the issuer of the account to tokenize the account;

receive, from the first user interface device, a request at the issuer of the account to digitize the user account associated with the first user interface device on the second user interface device, the second user interface device having a second unique identifier, wherein digitization comprises the preparation, by a tokenization service provider, of a provisioning package, generation of cryptographic keys, personalization scripts and data for provisioning a device token for the user account associated with the first user interface device to the second user interface device, wherein the device token is specific to the second user interface device and the digitization is based on the first unique identifier and the second unique identifier;

provide the first unique identifier and the second unique identifier to the wallet provider;

link the first user interface device to the second user interface device by the first unique identifier and the second unique identifier, wherein linking further comprises determining, via a wallet provider, the first user interface device and the second user interface device are both linked to the user account, the determination based on the wallet provider identifying the same user account is open using the first interface device and the second user interface device;

after the linking, receive, at the wallet provider from the first user interface device, authentication information for the second user interface device;

authenticate, at the wallet provider, the second user interface device based on the linking and the received authentication information for the second user interface device;

approve, by the issuer of the account, the second user interface device to receive the device token;

generate the device token by the service provider associated with a user account in response to approval;

provision the generated device token to the second user interface device, wherein provisioning of the device token to the second user interface device digitizes the second user interface device; and receive the provisioned device token at the second user interface device.

5. The system of claim 4, wherein the device token is for association with at least one second user device.

6. The system of claim 4, wherein the authentication processor is operative to further execute program instructions to: receive from a merchant at least one request to generate a higher assurance level associated with the token.

7. The system of claim 6, wherein the request is for the user to authenticate their account with the merchant.

8. The system of claim 7, wherein the authentication processor is operative to further execute program instructions to: initiate a communication between the user and the merchant.

9. The system of claim 8, wherein the authentication processor is operative to further execute program instructions to: generate, based on the initiated communication, two or more higher assurance level requests, wherein at least two of the higher assurance level requests are presented on a same user interface.

10. The system of claim 9, wherein the authentication processor is operative to further execute program instructions to: receive a selection of one or more higher assurance requests to provide authentication information.

* * * * *